US011907795B2

(12) United States Patent
Suzuki (10) Patent No.: US 11,907,795 B2
(45) Date of Patent: Feb. 20, 2024

(54) WIRELESS TAG COMMUNICATION DEVICE AND METHOD

(71) Applicant: TOSHIBA TEC KABUSHIKI KAISHA, Tokyo (JP)

(72) Inventor: Yuki Suzuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/860,790

(22) Filed: Jul. 8, 2022

(65) Prior Publication Data

US 2023/0063817 A1 Mar. 2, 2023

(30) Foreign Application Priority Data

Aug. 25, 2021 (JP) ................. 2021-136783

(51) Int. Cl.
*G06K 19/06* (2006.01)
*G06K 7/10* (2006.01)

(52) U.S. Cl.
CPC ................. *G06K 7/10316* (2013.01)

(58) Field of Classification Search
CPC ............. H04W 88/08; H04W 28/0236; G06K 7/10376; G06K 7/10316; G06K 7/10346; G06K 7/10405; G06K 19/07749; G06K 19/07; G06Q 10/0833; G06Q 10/087
USPC .......... 235/39, 492, 462.46, 472.02
See application file for complete search history.

(56) References Cited

U.S. PATENT DOCUMENTS

| 9,082,026 | B2 | 7/2015 | Sano et al. | |
|---|---|---|---|---|
| 11,436,421 | B2* | 9/2022 | Suzuki | G06K 17/0022 |
| 2005/0141594 | A1* | 6/2005 | Smith | H04B 1/713 375/E1.033 |
| 2013/0093569 | A1* | 4/2013 | Sano | H04W 52/287 340/10.1 |
| 2023/0171006 | A1* | 6/2023 | Verma | H04B 17/19 455/67.14 |

FOREIGN PATENT DOCUMENTS

JP 2009100274 * 7/2009 ............ H04B 1/59

* cited by examiner

*Primary Examiner* — Daniel St. Cyr
(74) *Attorney, Agent, or Firm* — FOLEY & LARDNER LLP (57) ABSTRACT

A wireless tag communication device includes an antenna configured to transmit a carrier wave and receive a response wave output from a wireless tag with respect to the carrier wave and to specify a position of the wireless tag to be searched based on a radio wave intensity of the response wave received by the antenna. The device includes: a radio wave controller configured to switch the carrier wave between a first and second carrier wave to be transmitted in a first and second polarization direction respectively; and a comparator configured to compare a first and second radio wave intensity of a first and second response wave respectively output from the wireless tag with respect to the first and second carrier waves respectively, and the radio wave controller switches the carrier wave between the first carrier wave and the second carrier wave based on a comparison result of the comparator.

17 Claims, 8 Drawing Sheets

WIRELESS TAG COMMUNICATION DEVICE AND METHOD

CROSS-REFERENCE TO RELATED APPLICATION

This application is based upon and claims the benefit of priority from Japanese Patent Application No. 2021-136783, filed on Aug. 25, 2021, the entire contents of which are incorporated herein by reference.

FIELD

Embodiments described herein relate generally to a wireless tag communication device and a method.

BACKGROUND

In recent years, a wireless tag communication device that searches for an article by utilizing a radio frequency identification (RFID) technique is used. There is known a wireless tag communication device that includes a handy RFID reader or the like carried by a user, recognizes a position of an article by communicating with an RFID tag (hereinafter, also referred to as a wireless tag) attached to the article, and displays the recognized position.

The wireless tag communication device is used in a warehouse or the like that stores a large number of merchandise, and can input identification information of a wireless tag attached to a merchandise to be searched (hereinafter, also referred to as "wireless tag to be searched") to search for the merchandise to be searched to which the wireless tag is attached from a large number of the merchandise. The wireless tag communication device recognizes a position of the merchandise to be searched by detecting a change in a radio wave intensity received from the wireless tag generated when the user moves with the wireless tag communication device.

DETAILED DESCRIPTION

In wireless tag communication devices such as those described above, a configuration in which a plurality of polarization directions are switched to output a radio wave so that communication can be performed regardless of a relationship between a direction of an antenna surface of the wireless tag communication device carried by the user and a direction of the wireless tag to be searched is adopted to the wireless tag communication device. However, the polarization directions are switched even after the position of the wireless tag to be searched is narrowed down and the direction of the antenna surface of the wireless tag communication device and the direction of the wireless tag to be searched become constant, and thus there is a problem that the search for the article is not always efficient. This is because such wireless tag communication devices always switch the polarization direction and outputs a carrier wave, and as a result, such wireless tag communication devices also output a radio wave in a polarization direction that does not contribute to the communication with the wireless tag to be searched.

In general, according to at least one embodiment, a wireless tag communication device that can efficiently search for a wireless tag to be searched and a method are provided.

A wireless tag communication device according to an embodiment includes an antenna configured to transmit a carrier wave and receive a response wave output from a wireless tag with respect to the carrier wave and is capable of specifying a position of a wireless tag to be searched based on a radio wave intensity of the response wave received by the antenna. The wireless tag communication device includes: a radio wave control unit (e.g., radio wave controller) configured to switch the carrier wave between a first carrier wave to be transmitted in a first polarization direction and a second carrier wave to be transmitted in a second polarization direction; and a comparison unit (e.g., comparator) configured to compare a radio wave intensity of a first response wave output from the wireless tag with respect to the first carrier wave and a radio wave intensity of a second response wave output from the wireless tag with respect to the second carrier wave, and the radio wave control unit (e.g., radio wave controller) switches the carrier wave between the first carrier wave and the second carrier wave based on a comparison result of the comparison unit.

Figure 1:
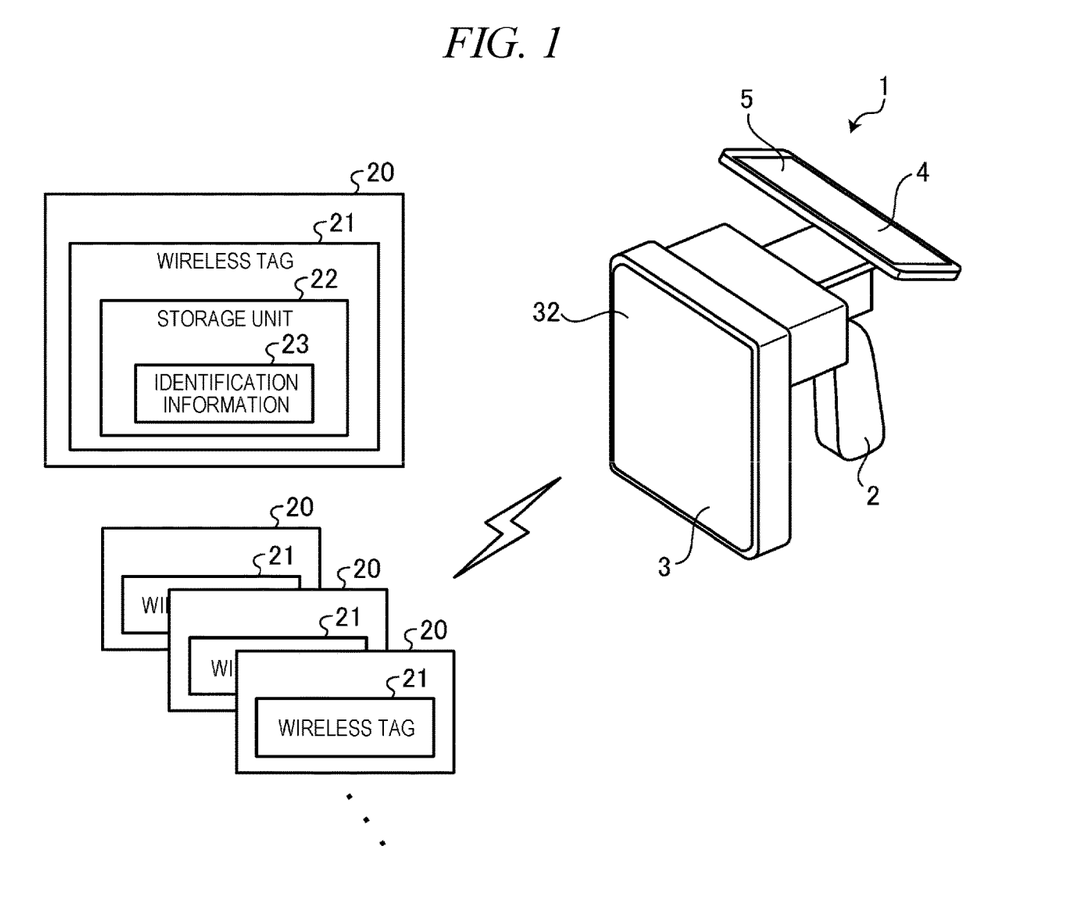
FIG. 1 is a diagram showing a usage pattern of a wireless tag communication device according to at least one embodiment.

Hereinafter, a wireless tag communication device and a method according to an embodiment will be described with reference to drawings. FIG. 1 is a diagram showing a usage pattern of the wireless tag communication device according to the embodiment. A wireless tag communication device 1 reads tag information stored in a wireless tag 21 by outputting a carrier wave (e.g., radio wave) to the wireless tag 21 attached to an article 20 and receiving a response wave (e.g., radio wave) with respect to the carrier wave from the wireless tag 21.

The article 20 is, for example, a merchandise stored in a warehouse of a retail store, a document stored in a library, and the like. There are a large number of the articles 20, and each wireless tag 21 is attached to each of the articles 20. A storage unit 22 of the wireless tag 21 stores identification information 23 that can identify its own wireless tag 21 and another wireless tag 21. The wireless tag 21 is a passive tag, is activated by receiving the carrier wave from the wireless tag communication device 1, and outputs the response wave with respect to the carrier wave. The carrier wave is also called a query wave. Accordingly, the wireless tag communication device 1 communicates with the wireless tag 21 attached to each article 20 and searches for a present position of the wireless tag 21 having the specific identification information 23, that is, a present position of the article 20.

The wireless tag communication device 1 is an RFID reader or the like that can be carried by a user, and includes a handle portion 2, an antenna unit 3, a display unit 4, and an operation unit 5.

The handle portion 2 is a portion gripped by the user during use and is formed in a shape protruding downward. The user can grip the handle portion 2 and turn the antenna unit 3 in each direction.

The antenna unit 3 is formed in a thin parallelepiped shape, and is provided with a planar antenna 31 (see FIG. 5) inside. The antenna 31 transmits and receives radio waves to and from the wireless tag 21. Specifically, the antenna 31 outputs a carrier wave including the identification information of the wireless tag 21 or the like, and receives a response wave output by an antenna 24 (see FIG. 3) of the wireless tag 21 with respect to the carrier wave. In addition, the antenna unit 3 has an antenna surface 32 having a planar surface on an opposite side to the handle portion 2. The antenna 31 outputs the carrier wave via the antenna surface 32 and receives the response wave from the antenna 24 of the wireless tag 21 via the antenna surface 32.

The display unit 4 is formed of, for example, a liquid crystal panel, and displays various information. For example, the display unit 4 displays a distance between the wireless tag communication device 1 and the wireless tag 21 to be searched, a direction in which the wireless tag 21 to be searched is present, and the like. In addition, the display unit 4 displays a screen on which an operation performed by the user is received, such as an input screen for inputting the identification information of the wireless tag 21 to be searched.

The operation unit 5 is formed of a touch panel provided on a surface of the display unit 4, and inputs information corresponding to a touched position to a control unit 10 (see FIG. 5) of the wireless tag communication device 1. The operation unit 5 inputs, for example, the identification information of the wireless tag 21 to be searched and information indicating end of the search to the control unit 10 according to the operation performed by the user.

Figure 2:
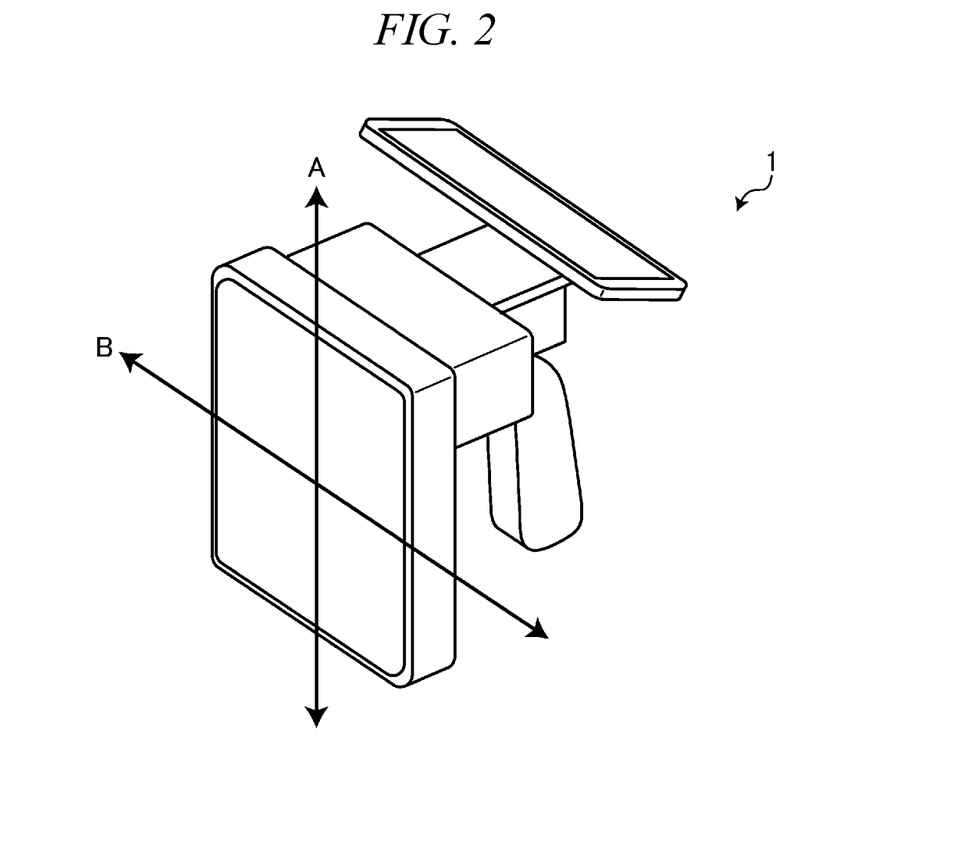
FIG. 2 is a diagram showing a relationship between the wireless tag communication device and a polarization direction of a carrier wave.

The wireless tag communication device 1 can switch a polarization direction of the carrier wave to be output. FIG. 2 is a diagram showing a relationship between the wireless tag communication device 1 and the polarization direction of the carrier wave. The wireless tag communication device 1 outputs a first carrier wave by a vertical polarization having a vertical polarization direction (e.g., first polarization direction A). In addition, the wireless tag communication device 1 outputs a second carrier wave by a horizontal polarization having a horizontal polarization direction (e.g., second polarization direction B).

More particularly, the wireless tag communication device 1 can perform a search operation in a dual polarization mode in which the first carrier wave and the second carrier wave are alternately transmitted from the antenna 31, or in a single polarization mode in which only one of the first carrier wave and the second carrier wave is transmitted. Here, the dual polarization mode in which the first carrier wave and the second carrier wave are alternately transmitted means an output mode in which a period during which the first carrier wave is transmitted and a period during which the second carrier wave is transmitted are alternately set.

Figure 3:
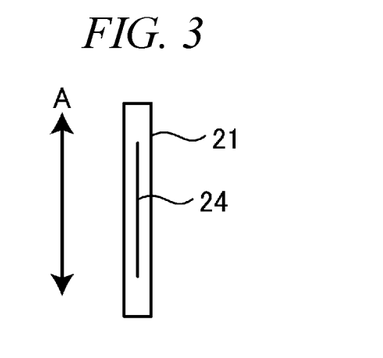
FIG. 3 is a diagram showing an example of a relationship between a first polarization direction and an antenna of a wireless tag.

FIG. 3 is a diagram showing an example of a relationship between the first polarization direction A and the antenna 24 of the wireless tag 21. The antenna 24 is, for example, an elongated dipole antenna provided along the wireless tag 21, and extends along a vertical direction in a state of FIG. 3. Accordingly, the polarization direction of the antenna 24 is a vertical direction.

In a state in which the wireless tag communication device 1 outputs the first carrier wave in the first polarization direction A, when the polarization direction of the antenna 24 of the wireless tag 21 is the vertical direction as shown in FIG. 3, that is, when the polarization direction of the antenna 24 is consistent with the polarization direction of the carrier wave, the antenna 24 receives the first carrier wave and the wireless tag 21 is easily activated. On the other hand, when the antenna 24 is provided along a horizontal direction, the wireless tag 21 is less likely to be activated.

Figure 4:
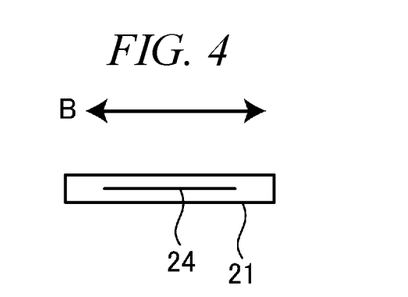
FIG. 4 is a diagram showing an example of a relationship between a second polarization direction and the antenna.

FIG. 4 is a diagram showing an example of a relationship between the second polarization direction B and the antenna 24 of the wireless tag 21. In a state of FIG. 4, a polarization direction of the antenna 24 is a horizontal direction. In a state in which the wireless tag communication device 1 outputs the second carrier wave in the second polarization direction B, the wireless tag 21 is easily activated when the polarization direction of the antenna 24 is the horizontal direction as shown in FIG. 4. On the other hand, when the antenna 24 is provided along the vertical direction, the wireless tag 21 is less likely to be activated.

When the wireless tag 21 is activated by the carrier wave, the wireless tag 21 outputs the response wave with respect to the carrier wave, and thus the wireless tag communication device 1 can receive the response wave to read the tag information of the wireless tag 21. In other words, it can be said that the wireless tag communication device 1 can easily read the tag information of the wireless tag 21 as the polarization direction of the antenna 24 of the wireless tag 21 is closer to the polarization direction of the carrier wave.

In an initial search stage in which a positional relationship between the antenna 31 of the wireless tag communication device 1 and the antenna 24 of the wireless tag 21 to be searched is unknown, since the first polarization direction A and the second polarization direction B are alternately switched each predetermined period, it is possible to increase a probability that the wireless tag communication device 1 reads the tag information of the wireless tag 21.

Figure 5:
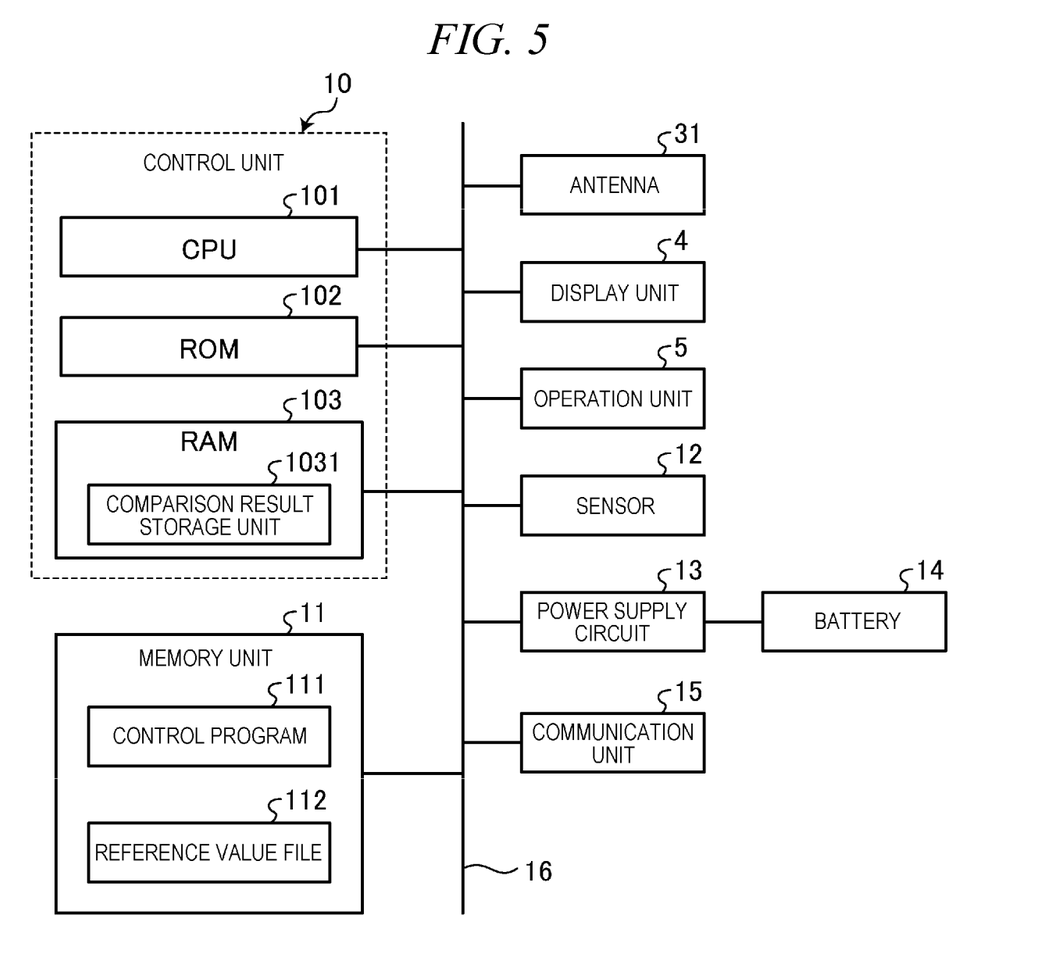
FIG. 5 is a block diagram showing a hardware configuration of the wireless tag communication device.

Next, a hardware configuration of the wireless tag communication device 1 will be described. FIG. 5 is a block diagram showing the hardware configuration of the wireless tag communication device 1. The wireless tag communication device 1 includes the control unit 10, a memory unit 11, the antenna 31, the display unit 4, the operation unit 5, a sensor 12, a power supply circuit 13, a battery 14, and a communication unit 15. The control unit 10, the memory unit 11, the antenna 31, the display unit 4, the operation unit 5, the sensor 12, the power supply circuit 13, and the communication unit 15 are connected to each other via a bus 16 or the like so as to be able to communicate with each other.

The control unit 10 includes a computer on which a central processing unit (CPU) 101, a read only memory (ROM) 102, and a random access memory (RAM) 103 are installed. The CPU 101, the ROM 102, and the RAM 103 are connected to each other via the bus 16.

The CPU 101 controls the entire wireless tag communication device 1. The ROM 102 stores various programs such as a program to be used to drive the CPU 101 and various data. The RAM 103 includes a comparison result storage unit 1031. The comparison result storage unit 1031 stores information on a radio wave intensity of a response wave (e.g., first response wave) of the wireless tag 21 with respect to the first carrier wave to be transmitted from the antenna 31 and a radio wave intensity of a response wave (e.g., second response wave) of the wireless tag 21 with respect to the second carrier wave. For example, the comparison result storage unit 1031 stores a comparison result between the radio wave intensity of the first response wave and the radio wave intensity of the second response wave. In addition, the RAM 103 is used as a work area of the CPU 101, and loads various programs and various data stored in the ROM 102 and the memory unit 11. The control unit 10 executes various control processes of the wireless tag communication device 1 by the CPU 101 operating in accordance with a control program stored in the ROM 102 or the memory unit 11 and loaded in the RAM 103.

The memory unit 11 includes a storage medium such as a hard disk drive (HDD) or a flash memory, and maintains a stored content even when a power supply is turned off. The memory unit 11 stores a control program 111 and a reference value file 112.

The control program 111 is a control program or the like for implementing various functions of the wireless tag communication device 1.

The reference value file 112 stores a reference value used for controlling the carrier wave transmitted by the antenna 31. Specifically, the reference value file 112 stores the set number of times X as a condition for switching the output mode from the dual polarization mode in which the first carrier wave and the second carrier wave are alternately transmitted to the single polarization mode in which only one of the first carrier wave and the second carrier wave is transmitted.

The set number of times X is a reference value related to the comparison result between the radio wave intensity of the first response wave with respect to the first carrier wave and the radio wave intensity of the second response wave with respect to the second carrier wave output subsequent to the first carrier wave in the dual polarization mode in which the first carrier wave and the second carrier wave are alternately transmitted. In the dual polarization mode, the period during which the first carrier wave is output and the period during which the second carrier wave is output are alternately and continuously output. Therefore, the comparison between the radio wave intensity of the first response wave with respect to the first carrier wave and the radio wave intensity of the second response wave with respect to the second carrier wave output subsequent to the first carrier wave is performed a plurality of times.

The set number of times X defines a reference value of the number of times that the radio wave intensity of one of the first response wave and the second response wave is continuously higher than that of the other response wave. As the comparison result between the radio wave intensity of the first response wave and the radio wave intensity of the second response wave in the dual polarization mode, for example, when the radio wave intensity of the first response wave is continuously higher than that of the second response wave for the set number of times X or more, the control unit 10 performs control in the single polarization mode in which the first carrier wave is continuously transmitted.

The first response wave is, for example, a response wave received during a period during which the wireless tag communication device 1 outputs the first carrier wave. The radio wave intensity of the first response wave can be, for example, an average value of the response waves received during the period during which the first carrier wave is output. Similarly, the second response wave is, for example, a response wave received during a period during which the wireless tag communication device 1 outputs the second carrier wave. The radio wave intensity of the second response wave can be, for example, an average value of the response waves received during the period during which the second carrier wave is output.

Configurations and functions of the antenna 31, the display unit 4, and the operation unit 5 are as described above.

The sensor 12 detects a direction in which the wireless tag communication device 1 faces. The sensor 12 includes a sensor device such as a direction sensor and an angle sensor, and a calculation unit that calculates the direction of the wireless tag communication device 1 based on a detection value of the sensor device.

The power supply circuit 13 is connected to the battery 14. The power supply circuit 13 is a circuit that supplies electric power to each hardware of the wireless tag communication device 1. The power supply circuit 13 supplies the electric power to each hardware by stepping down a voltage supplied from the battery 14 to an operation voltage of each hardware or the like. The battery 14 can be charged by being connected to a commercial power supply via a charging device (not shown).

The communication unit 15 is an interface for communicating with an external device such as a management personal computer (PC). The management PC stores, for example, information (such as a merchandise name) on each article 20 and the identification information on the wireless tag 21 attached to each article 20 in association with each other. The control unit 10 can transmit and receive information (e.g., data) to and from the external device by being connected to the external device via the communication unit 15. The control unit 10 can receive the identification information that identifies the wireless tag 21 to be searched from the management PC via the communication unit 15.

Figure 6:
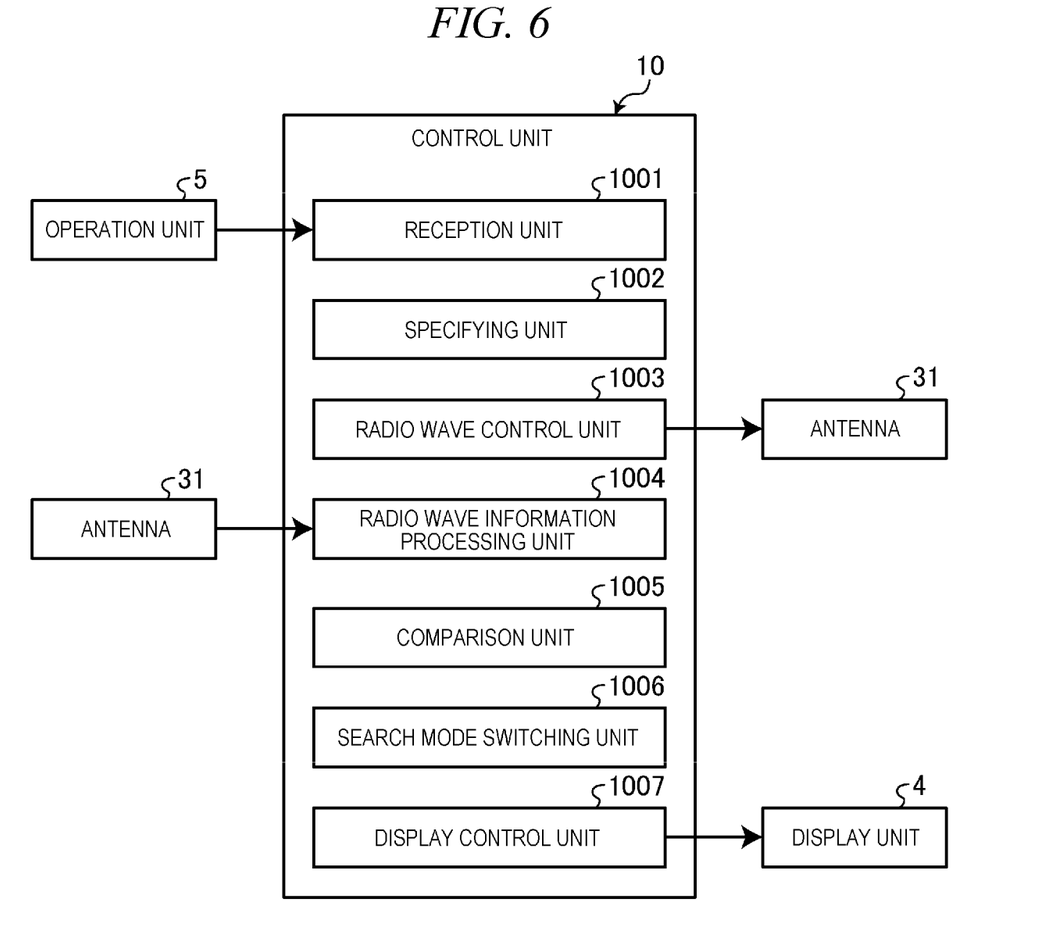
FIG. 6 is a block diagram showing a functional configuration.

Subsequently, a functional configuration of the wireless tag communication device 1 will be described. FIG. 6 is a block diagram showing a main functional configuration of the control unit 10 of the wireless tag communication device 1. The control unit 10 functions as a reception unit 1001 (e.g., receiver), a specifying unit 1002, a radio wave control unit 1003, a radio wave information processing unit 1004 (e.g., a radio wave information processor), a comparison unit 1005, a search mode switching unit 1006 (e.g., search mode switcher), and a display control unit 1007 when the CPU 101 operates in accordance with the control program stored in the ROM 102 or the memory unit 11. These functions may be implemented by hardware such as a dedicated circuit.

The reception unit 1001 receives the identification information that identifies the wireless tag 21 to be searched. Specifically, the reception unit 1001 receives the identification information input by the operation unit 5 or the identification information input from the management PC via the communication unit 15. The identification information is information that identifies the wireless tag 21 to be searched, and is stored in the wireless tag 21. The identification information may identify (e.g., specify) one wireless tag 21 or may identify a plurality of the wireless tags 21.

For example, when the wireless tag 21 is used by being attached to the merchandise, information indicating a merchandise code or a stock keeping unit (SKU) may be used to identify the plurality of wireless tags 21. The merchandise code is a code that identifies the merchandise, and the information indicating the SKU is information that identifies a merchandise management unit set by the user. The wireless tag 21 attached to the merchandise stores, for example, information indicating an individual product such as a serial number of the merchandise and the information indicating the merchandise code or the SKU. Accordingly, the user can specify the wireless tag 21 to be searched for in units of individual products or in units of merchandise classification such as the merchandise code or the SKU. In addition, the reception unit 1001 receives instruction information that is input from the operation unit 5 and that instructs the start or end of the search for the article. The reception unit 1001 receives various other information input to the control unit 10.

The specifying unit 1002 specifies the wireless tag 21 to be searched and generates search information for searching for the wireless tag 21 to be searched. For example, the specifying unit 1002 specifies the identification information received by the reception unit 1001 to generate information including a command for communicating with the wireless tag 21 to be searched. The identification information can be specified by using a specific command.

The radio wave control unit 1003 switches the carrier wave between the first carrier wave transmitted in the first polarization direction A and the second carrier wave transmitted in the second polarization direction B. For example, the radio wave control unit 1003 causes the antenna 31 to transmit the carrier wave in the single polarization mode when the search for the wireless tag 21 identified by the identification information received by the reception unit 1001 is started. The radio wave control unit 1003 may control the carrier wave in the dual polarization mode when the search for the wireless tag 21 is started.

The radio wave control unit 1003 switches the output mode to the dual polarization mode when the antenna 31 does not receive the response wave with respect to the carrier wave in a state in which the carrier wave is controlled in the single polarization mode. Depending on the position of the wireless tag 21 to be searched, the wireless tag 21 may not be activated by the carrier wave in one polarization direction, and thus the radio wave control unit 1003 causes the antenna 31 to transmit the carrier wave in the other polarization direction as necessary.

Further, the radio wave control unit 1003 switches the output mode to the single polarization mode when the comparison result between the radio wave intensity of the first response wave with respect to the first carrier wave and the radio wave intensity of the second response wave with respect to the second carrier wave output subsequent to the first carrier wave satisfies a certain condition in a state in which the carrier wave is controlled in the dual polarization mode. Specifically, in the dual polarization mode, when the radio wave intensity of one of the first response wave and the second response wave is continuously higher than that of the other response wave for X times, which is the set number of times, the radio wave control unit 1003 switches the output mode from the dual polarization mode to the single polarization mode using the carrier wave corresponding to the response wave having the higher radio wave intensity.

More specifically, as the comparison result between the radio wave intensity of the first response wave and the radio wave intensity of the second response wave repeatedly performed in the dual polarization mode, for example, when the radio wave intensity of the first response wave is continuously higher than that of the second response wave for X times, which is the set number of times, the radio wave control unit 1003 switches the output mode to the single polarization mode using the first carrier wave.

When the state in which the radio wave intensity of one response wave is higher than that of the other response wave continues, it is estimated that the user is approaching the wireless tag 21 to be searched while maintaining a state in which a relationship between a direction of the antenna 31 of the wireless tag communication device 1 and a direction of the antenna 24 of the wireless tag 21 does not change. Further, it is considered that the wireless tag communication device 1 can communicate with the wireless tag 21 by only using the carrier wave with respect to the response wave having the high radio wave intensity. Therefore, in this state, the radio wave control unit 1003 continuously outputs the carrier wave in the one polarization direction. Accordingly, by stopping the output of the carrier wave that does not contribute to the reading of the tag information, a time of reading the tag information can be shortened and the tag information can be read efficiently.

Further, the radio wave control unit 1003 controls an output value (radio wave intensity) of the carrier wave output from the antenna 31. The radio wave control unit 1003 controls the output of the carrier wave in a plurality of stages within a preset range. Here, when the wireless tag 21 is activated by the carrier wave output by the wireless tag communication device 1 and the wireless tag communication device 1 receives the response wave from the wireless tag 21, it is also referred to as "communication succeeded". In addition, when the wireless tag communication device 1 does not receive the response wave with respect to the carrier wave output by the wireless tag communication device 1, it is also referred to as "communication failed".

When the communication succeeds continuously for the preset number of times in the single polarization mode or the dual polarization mode, the radio wave control unit 1003 determines that the wireless tag 21 to be searched is present within a readable range of the wireless tag communication device 1, and decreases the output value of the carrier wave by one stage. The wireless tag communication device 1 narrows down the readable range by decreasing the output value of the carrier wave while maintaining a state in which the radio wave control unit 1003 determines that the wireless tag 21 is present within the readable range. Accordingly, the position where the wireless tag 21 to be searched is present is narrowed down.

In addition, when the wireless tag communication device 1 and the wireless tag 21 do not succeed in continuous communication for the preset number of times, the radio wave control unit 1003 determines that no wireless tag 21 is present within the readable range, and increases the output value of the carrier wave by one stage. Accordingly, even though the user erroneously moves away from the wireless tag 21 to be searched, the tag information of the wireless tag 21 to be searched can be read.

The radio wave information processing unit 1004 executes various processes based on information on the response wave received by the antenna 31. For example, the radio wave information processing unit 1004 determines whether the wireless tag 21 to be searched is within the readable range of the tag information of the wireless tag communication device 1 based on the radio wave intensity of the response wave. In addition, the radio wave information processing unit 1004 estimates the distance between the wireless tag communication device 1 and the wireless tag 21 to be searched and the direction of the wireless tag 21 to be searched based on the radio wave intensity of the response wave. The radio wave information processing unit 1004 handles a response wave received while the first carrier wave is being output as the first response wave, and handles a response wave received while the second carrier wave is being output as the second response wave.

The comparison unit 1005 compares the radio wave intensity of the first response wave output by the wireless tag 21 with respect to the first carrier wave with the radio wave intensity of the second response wave output by the wireless tag 21 with respect to the second carrier wave. Specifically, in the dual polarization mode, the comparison unit 1005 compares the radio wave intensity of the first response wave received during the period during which the first carrier wave is output with the radio wave intensity of the second response wave received during the period during which the second carrier wave is output following the period during which the first carrier wave is output.

In the following description, the first carrier wave and the second carrier wave output subsequent to the first carrier wave, that is, the first carrier wave transmitted for the predetermined period and the second carrier wave transmitted for the predetermined period subsequent to the first carrier wave may be collectively referred to as a "pair of carrier waves". In addition, the first response wave with respect to the first carrier wave and the response wave with respect to the second carrier wave following the first carrier wave may be collectively referred to as a "pair of response waves". For example, when the pair of carrier waves are output ten times in the dual polarization mode, the comparison unit 1005 compares the radio wave intensities of the pair of response waves ten times.

The comparison unit 1005 compares the radio wave intensity of the response wave with 0 in the single polarization mode. For example, in the single polarization mode using the first carrier wave, the comparison unit 1005 regards the radio wave intensity of the second response wave as 0 and compares the radio wave intensity of the first response wave with the radio wave intensity of the second response wave.

The search mode switching unit 1006 switches an operation mode for searching for the wireless tag 21 between a long-distance search mode and a short-distance search mode. Specifically, the search mode switching unit 1006 is set to the long-distance search mode in which the output value of the carrier wave output by the antenna 31 at the start of the search is variable. The wireless tag communication device 1 narrows down the position where the wireless tag 21 to be searched is present in the long-distance search mode.

The search mode switching unit 1006 is set to the short-distance search mode in which the output value of the carrier wave output by the antenna 31 is constant when the position where the wireless tag 21 to be searched is present is narrowed down.

The display control unit 1007 causes the display unit 4 to display various information. For example, the display control unit 1007 displays a display screen indicating the direction in which the wireless tag 21 to be searched is present and the distance to the wireless tag 21 based on the radio wave intensity of the response wave received by the antenna 31 and the output of the sensor 12.

Figure 7:
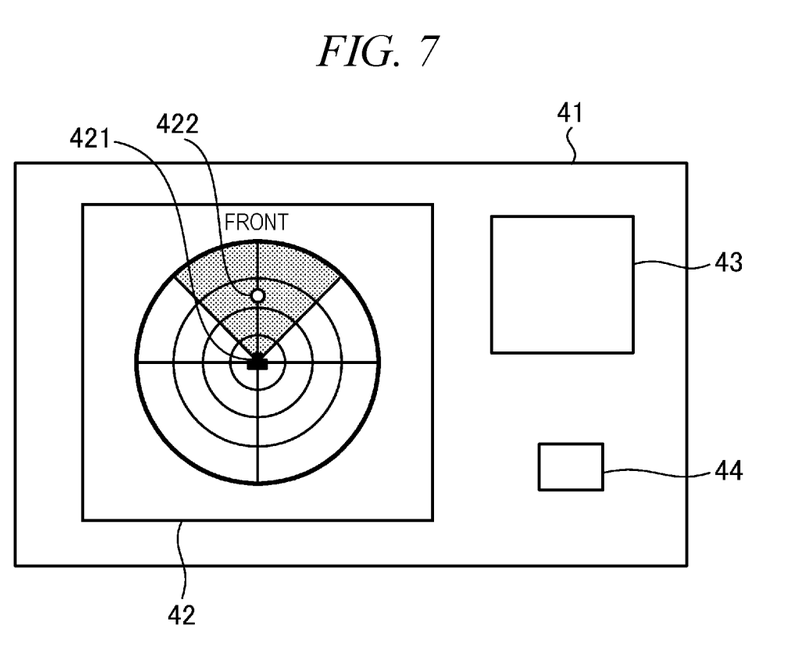
FIG. 7 is a diagram showing an example of a display screen of a display unit.

FIG. 7 is a diagram showing an example of the display screen during the search for the wireless tag 21. A display screen 41 displays a tag position display unit 42, a tag information display unit 43, and an end button unit 44.

The tag position display unit 42 shows a positional relationship between the wireless tag communication device 1 and the wireless tag 21 to be searched. The tag position display unit 42 displays a concentric-shaped distance mark. A central portion 421 of the concentric-shaped distance mark indicates a position of the wireless tag communication device 1, and it means that the distance from the wireless tag communication device 1 increases toward an outer circle. The tag position display unit 42 displays a tag position unit 422 indicating a position of the wireless tag 21 to be searched at a position away from the central portion 421 of a concentric circle.

The tag information display unit 43 displays information on the wireless tag 21 to be searched and information on the article to which the wireless tag 21 is attached. For example, the tag information display unit 43 displays the identification information stored in the wireless tag 21 to be searched, a name of the article to which the wireless tag 21 is attached, and the like.

The end button unit 44 displays an end button. The end button is an operation button for instructing the end of the search for the wireless tag 21. When the end button is operated during an operation in the long-distance search mode or the short-distance search mode, the wireless tag communication device 1 stops the output of the carrier wave from the antenna 31 to end the search in the search mode.

Figure 8:
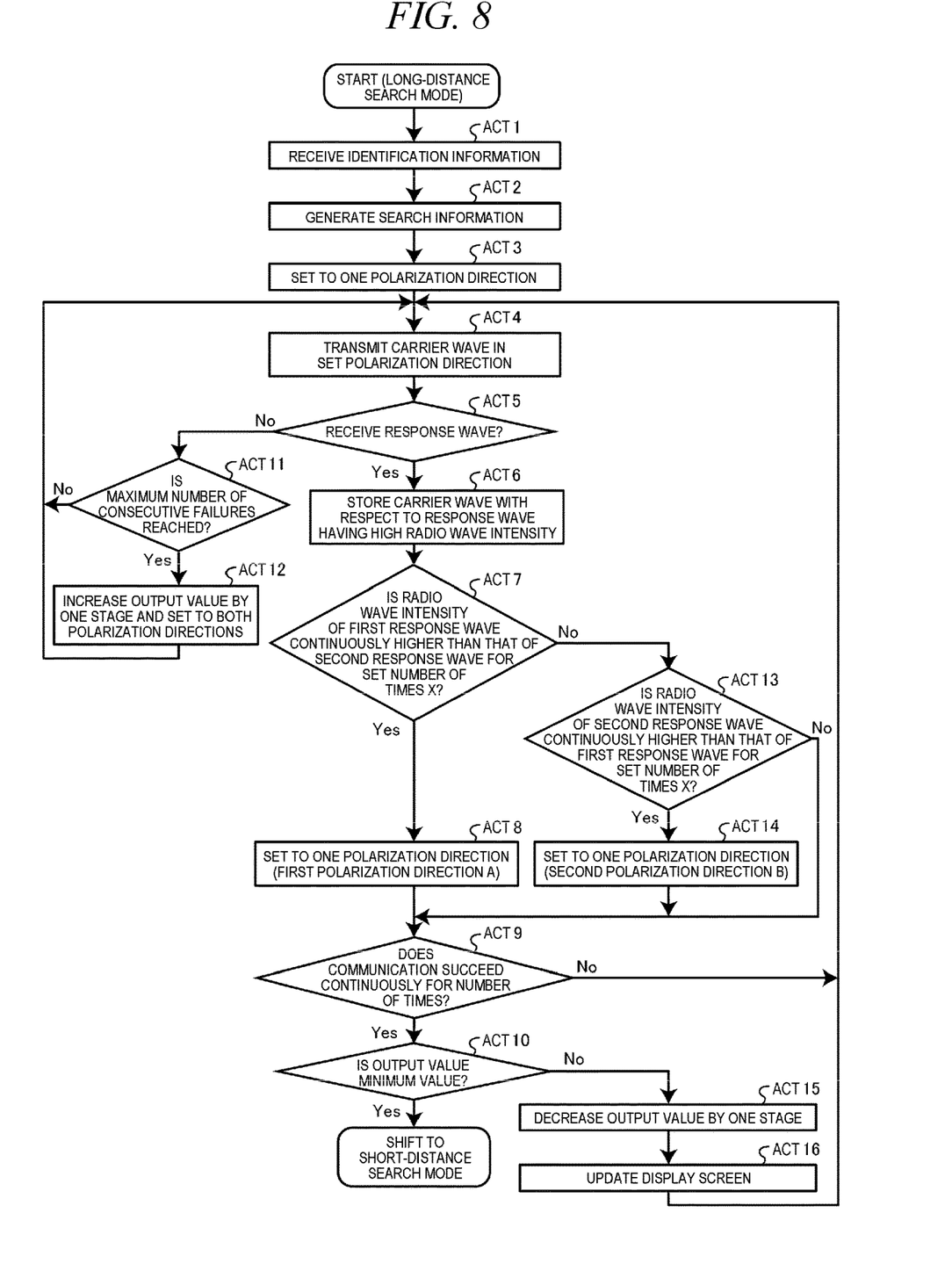
FIG. 8 is a flowchart illustrating a flow of a long-distance search process performed by a control unit.

Next, a search process of the wireless tag 21 to be searched will be described. FIG. 8 is a flowchart illustrating a flow of the long-distance search process performed by the control unit 10 of the wireless tag communication device 1.

When the user inputs the identification information of the wireless tag 21 to be searched by operating the operation unit 5, the reception unit 1001 receives the identification information (ACT 1). Subsequently, the specifying unit 1002 specifies the wireless tag 21 to be searched based on the identification information received by the reception unit 1001, and generates the search information for searching for the wireless tag 21 (ACT 2).

The radio wave control unit 1003 sets the polarization direction of the carrier wave to the one polarization direction (ACT 3). The polarization direction to be set is preset in either the first polarization direction A or the second polarization direction B. In other words, the radio wave control unit 1003 is set to the single polarization mode using either the first carrier wave or the second carrier wave. According to the present embodiment, the radio wave control unit 1003 sets the output mode to the single polarization mode in the first polarization direction A.

Subsequently, the radio wave control unit 1003 outputs the carrier wave including the search information generated by the specifying unit 1002 from the antenna 31 in the set polarization direction (ACT 4). Specifically, at the start of the search, the radio wave control unit 1003 causes the antenna 31 to transmit the carrier wave in the single polarization mode in the first polarization direction set in ACT 3, specifically, in the single polarization mode using the first carrier wave.

The control unit 10 determines whether the antenna 31 receives the response wave from the wireless tag 21 to be searched (ACT 5). Specifically, the control unit 10 determines whether radio wave information is input from the antenna 31 to the radio wave information processing unit 1004. When the response wave is received (YES in ACT 5), the radio wave information processing unit 1004 stores information indicating the carrier wave with respect to the response wave having the high radio wave intensity in the comparison result storage unit 1031 as the result of the comparison unit 1005 comparing the radio wave intensities of the pair of response waves (ACT 6). Since the single polarization mode using the first carrier wave is set at the start of the search, the comparison unit 1005 compares the radio wave intensity of the first response wave with 0, which is regarded as a value of the second response wave. Accordingly, the comparison result storage unit 1031 stores information indicating the first carrier wave. In the case of the single polarization mode, the comparison performed by the comparison unit 1005 may be omitted. For example, in the case of the single polarization mode using the first carrier wave, the comparison result storage unit 1031 may store the information indicating the first carrier wave without performing the comparison by the comparison unit 1005.

Next, the radio wave control unit 1003 determines, as the comparison result of the comparison unit 1005, whether the radio wave intensity of the first response wave is continuously higher than that of the second response wave for the set number of times X (ACT 7). Specifically, the radio wave control unit 1003 determines whether the information indicating the first carrier wave is continuously stored in the comparison result storage unit 1031.

When the radio wave intensity of the first response wave is continuously higher than that of the second response wave for the set number of times X (YES in ACT 7), the radio wave control unit 1003 sets the polarization direction of the carrier wave to the one polarization direction based on the first polarization direction A (ACT 8). Subsequently, the control unit 10 determines whether the communication succeeds continuously for the set number of times (ACT 9), and if the communication succeeds continuously (YES in ACT 9), the control unit 10 determines whether the output value of the carrier wave is the minimum value of values set in the plurality of stages (ACT 10).

If the value is the minimum value (YES in ACT 10), the search mode switching unit 1006 determines that the wireless tag 21 to be searched is located in the vicinity of the wireless tag communication device 1, and shifts the output mode to the short-distance search mode.

In the process of ACT 5, if no response wave with respect to the carrier wave transmitted by the antenna 31 is received (NO in ACT 5), that is, if the communication fails, the control unit 10 determines whether the set number of consecutive failures is reached (ACT 11), and if the set number of consecutive failures is not reached (NO in ACT 11), the control unit 10 returns to the process of ACT 4.

If the set number of consecutive failures is reached (YES in ACT 11), the radio wave control unit 1003 increases the output value of the carrier wave by one stage and sets the carrier wave in both polarization directions (ACT 12). At this time, if the output value of the carrier wave is already the maximum value, the radio wave control unit 1003 maintains the output value of the carrier wave at the maximum value. Then, the control unit 10 returns to the process of ACT 4.

In the process of ACT 7, if a state in which the radio wave intensity of the first response wave is higher than that of the second response wave is not continued for the set number of times X (NO in ACT 7), the radio wave control unit 1003 determines whether the radio wave intensity of the second response wave is continuously higher than that of the first response wave for the set number of times X (ACT 13).

If the radio wave intensity of the second response wave is continuously higher than that of the first response wave for the set number of times X (YES in ACT 13), the radio wave control unit 1003 sets the polarization direction of the carrier wave to the one polarization direction based on the second polarization direction B (ACT 14). Then, the control unit 10 proceeds to the process of ACT 9. If the state in which the radio wave intensity of the second response wave is higher than that of the first response wave is not continued for the set number of times X (NO in ACT 13), the control unit 10 skips the process of ACT 14 and proceeds to the process of ACT 9.

In the process of ACT 9, if the communication does not succeed continuously for the set number of times (NO in ACT 9), the control unit 10 returns to the process of ACT 4.

In the process of ACT 10, if the output value of the carrier wave is not the minimum value (NO in ACT 10), the radio wave control unit 1003 decreases the output value of the carrier wave by one stage (ACT 15). Then, the display control unit 1007 updates the display screen 41 of the display unit 4. The display control unit 1007 updates the display screen 41 so that the central portion 421 of the concentric circle of the tag position display unit 42 and the tag position unit 422 are brought closer to each other. Then, the control unit 10 returns to the process of ACT 4.

According to the above processes, when the tag information of the wireless tag 21 to be searched can be read by only one of the first carrier wave and the second carrier wave, the wireless tag communication device 1 switches to continuously output only one of the first carrier wave and the second carrier wave. Therefore, since the output of the useless carrier wave that does not contribute to the reading of the tag information is stopped, the wireless tag 21 to be searched can be efficiently searched.

Figure 9:
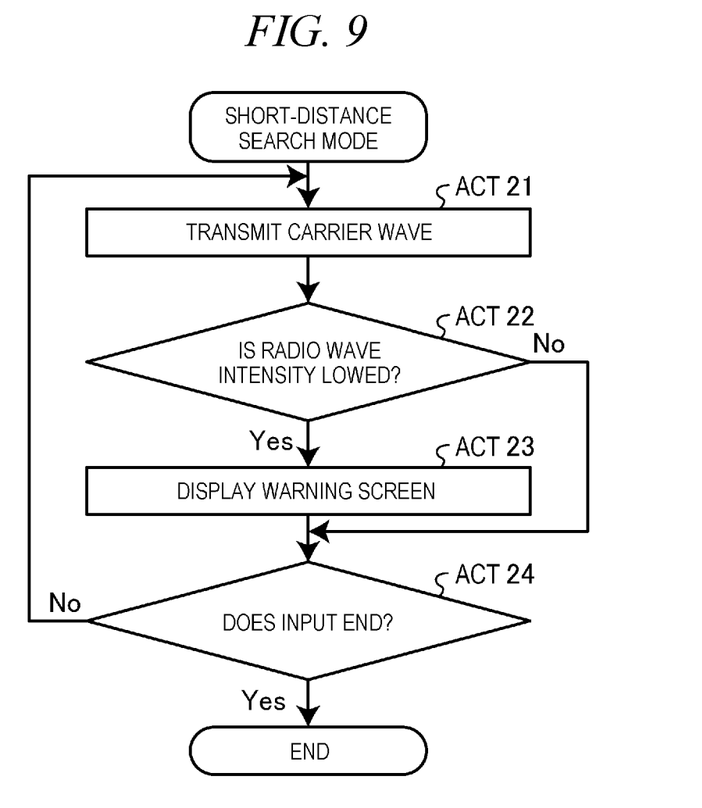
FIG. 9 is a flowchart illustrating a flow of a short-distance search process.

Subsequently, a process of the short-distance search mode will be described. FIG. 9 is a flowchart illustrating a flow of a short-distance search process performed by the control unit 10 of the wireless tag communication device 1.

In the short-distance search mode, the radio wave control unit 1003 causes the antenna 31 to transmit the carrier wave with the minimum output value (ACT 21). The carrier wave at this time is output in a polarization direction immediately before shifting to the short-distance search mode. Normally, at a stage of shifting to the short-distance search mode, the direction of the antenna 31 of the wireless tag communication device 1 and the direction of the antenna 24 of the wireless tag 21 to be searched are constant. Therefore, as the comparison result of the comparison unit 1005, the radio wave intensity of one of the first response wave and the second response wave is continuously higher than that of the other response wave for the set number of times X. Therefore, normally, the single polarization mode using the first carrier wave or the second carrier wave is set at the stage of shifting to the short-distance search mode.

Subsequently, the radio wave information processing unit 1004 determines whether the radio wave intensity of the response wave received by the antenna 31 is lower than that of the response wave with respect to the previous carrier wave (ACT 22). If the radio wave intensity of the response wave received by the antenna 31 is lower than that of the response wave with respect to the previous carrier wave (YES in ACT 22), the display control unit 1007 displays a warning screen on the display unit 4 (ACT 23). The warning screen notifies the user that the wireless tag communication device 1 is moving away from the wireless tag 21 to be searched. Accordingly, the warning screen prompts the user to return the position of the wireless tag communication device 1.

Next, the control unit 10 determines whether an input to end the search for the wireless tag 21 is made on the operation unit 5 (ACT 24), and if no input is made (NO in ACT 24), the control unit 10 returns to the process of ACT 21. If the input to end the search is made (YES in ACT 24), the control unit 10 ends the process.

In the process of ACT 22, if the radio wave intensity of the response wave received by the antenna 31 is not lower than that of the response wave with respect to the previous carrier wave (NO in ACT 22), the control unit 10 skips the process of ACT 23 and proceeds to the process of ACT 24.

As described above, the wireless tag communication device 1 according to the embodiment includes the antenna 31 configured to transmit the carrier wave and receives the response wave output from the wireless tag 21 with respect to the carrier wave and is capable of specifying the position of the wireless tag 21 to be searched based on the radio wave intensity of the response wave received by the antenna 31. The wireless tag communication device 1 further includes: the radio wave control unit 1003 configured to switch the carrier wave between the first carrier wave to be transmitted in the first polarization direction A and the second carrier wave to be transmitted in the second polarization direction B; and the comparison unit 1005 configured to compare the radio wave intensity of the first response wave output from the wireless tag 21 with respect to the first carrier wave and the radio wave intensity of the second response wave output from the wireless tag 21 with respect to the second carrier wave, and the radio wave control unit 1003 switches the carrier wave between the first carrier wave and the second carrier wave based on the comparison result of the comparison unit 1005.

For example, the radio wave control unit 1003 can set the output mode of the carrier wave transmitted from the antenna 31 to the dual polarization mode in which the first carrier wave and the second carrier wave are alternately transmitted and the single polarization mode in which only one of the first carrier wave and the second carrier wave is transmitted.

Accordingly, since the wireless tag communication device 1 can appropriately switch the polarization direction of the carrier wave, and can efficiently search for the wireless tag 21 to be searched.

The comparison unit 1005 compares the radio wave intensity of the first response wave transmitted from the wireless tag 21 with respect to the first carrier wave and the radio wave intensity of the second response wave transmitted from the wireless tag 21 with respect to the second carrier wave transmitted subsequent to the first carrier wave in the dual polarization mode, and as the comparison result of the comparison unit 1005, when the radio wave intensity of one of the first response wave and the second response wave is continuously higher than that of the other response wave for the preset number of times X or more, the radio wave control unit 1003 switches the output mode to the single polarization mode in which the carrier wave with respect to the response wave having the high radio wave intensity is continuously transmitted.

Accordingly, during the search in the dual polarization mode, when the tag information of the wireless tag 21 to be searched can be read by only one of the first carrier wave and the second carrier wave, the output mode of the carrier wave is switched to the single polarization mode using the one of the first carrier wave and the second carrier wave. Therefore, since it is possible to automatically switch to the output of only a carrier wave that contributes to the reading of the tag information, an operability of the wireless tag communication device 1 can be improved.

Further, the radio wave control unit 1003 of the wireless tag communication device 1 according to the embodiment switches the output mode to the dual polarization mode when the antenna 31 does not receive the response wave in the single polarization mode.

Accordingly, during the search in the single polarization mode, when the wireless tag communication device 1 cannot read the tag information due to a change in the position of the wireless tag communication device 1 with respect to the wireless tag 21 to be searched, the output mode of the carrier wave is switched to the dual polarization mode. Therefore, it is possible to switch to the dual polarization mode as necessary, and the operability can be improved from this point as well.

The wireless tag communication device 1 according to the embodiment further includes the reception unit 1001 configured to receive the identification information that identifies the wireless tag 21 to be searched, and the radio wave control unit 1003 sets the output mode to the single polarization mode when the search for the wireless tag 21 identified by the identification information received by the reception unit 1001 is started.

Accordingly, if the tag information of the wireless tag 21 to be searched can be read in the single polarization mode at the start of the search, the search can be executed in the single polarization mode from the start to the end of the search, and the search can be executed extremely efficiently. In addition, if the tag information of the wireless tag 21 to be searched cannot be read in the single polarization mode at the start of the search, it is possible to automatically switch to the dual polarization mode, and thus the operability is not reduced.

According to the above embodiment, the control program executed by the wireless tag communication device 1 may be provided by recording the control program on a computer-readable recording medium such as a CD-ROM. In addition, the control program executed by the wireless tag communication device 1 according to the above embodiment may be stored in the computer connected to a network such as the Internet and provided by being downloaded via the network, and further may be provided via the network such as the Internet.

The embodiments of the disclosure have been described, but these embodiments are presented as examples only, and are not intended to limit the scope of the disclosure. These embodiments can be implemented in other various forms, and various omissions, replacements, and changes can be made without departing from the spirit of the disclosure.

What is claimed is:

1. A wireless tag communication device including an antenna configured to transmit a carrier wave and receive a response wave output from a wireless tag with respect to the carrier wave, and configured to specify a position of the wireless tag to be searched based on a radio wave intensity of the response wave received by the antenna, the wireless tag communication device further comprising:
   a radio wave controller configured to switch the carrier wave between a first carrier wave to be transmitted in a first polarization direction and a second carrier wave to be transmitted in a second polarization direction;
   a comparator configured to compare a radio wave intensity of a first response wave output by the wireless tag with respect to the first carrier wave and a radio wave intensity of a second response wave output by the wireless tag with respect to the second carrier wave,
   the radio wave controller being configured to switch the carrier wave between the first carrier wave and the second carrier wave based on a comparison result of the comparator,
   the radio wave controller is configured to set an output mode of the carrier wave transmitted from the antenna to a dual polarization mode in which the first carrier wave and the second carrier wave are alternately transmitted or to a single polarization mode in which only one of the first carrier wave and the second carrier wave is transmitted; and a receiver configured to receive identification information that identifies the wireless tag to be searched, wherein the radio wave controller sets the output mode to the single polarization mode when a search for the wireless tag identified by the identification information received by the receiver is started.

2. The device according to claim 1, wherein the comparator is configured to compare, in the dual polarization mode, the radio wave intensity of the first response wave transmitted from the wireless tag with respect to the first carrier wave and the radio wave intensity of the second response wave transmitted from the wireless tag with respect to the second carrier wave transmitted subsequent to the first carrier wave, and as the comparison result of the comparator, when the radio wave intensity of one of the first response wave or the second response wave is continuously higher than that of the other response wave for a preset number of times or more, the radio wave controller switches the output mode to the single polarization mode in which the carrier wave with respect to the response wave having the higher radio wave intensity is continuously transmitted.

3. The device according to claim 1, wherein the radio wave controller is configured to switch the output mode to the dual polarization mode when the antenna does not receive the response wave in the single polarization mode.

4. The device according to claim 1, further comprising:

a radio wave information processor configured to estimate a distance between the wireless tag communication device and the wireless tag to be searched and to estimate a direction of the wireless tag to be searched, based on the radio wave intensity of the response wave.

5. The device according to claim 1, further comprising:

a display configured to display a positional relationship between the wireless tag communication device and the wireless tag.

6. The device according to claim 5, wherein the display is configured to provide a warning when an earlier radio wave intensity of the radio wave received by the antenna is lower than a subsequent radio wave intensity of the radio wave received by the antenna.

7. A wireless tag communication device including an antenna configured to transmit a carrier wave and receive a response wave output from a wireless tag with respect to the carrier wave, and configured to specify a position of the wireless tag to be searched based on a radio wave intensity of the response wave received by the antenna, the wireless tag communication device further comprising:

a radio wave controller configured to switch the carrier wave between a first carrier wave to be transmitted in a first polarization direction and a second carrier wave to be transmitted in a second polarization direction; and a comparator configured to compare a radio wave intensity of a first response wave output by the wireless tag with respect to the first carrier wave and a radio wave intensity of a second response wave output by the wireless tag with respect to the second carrier wave, the radio wave controller being configured to switch the carrier wave between the first carrier wave and the second carrier wave based on a comparison result of the comparator, wherein the radio wave controller is configured to control an output value of the carrier wave in a plurality of stages, the radio wave controller decreases the output value of the carrier wave by one stage when the wireless tag communication device receives the response wave from the wireless tag a first preset number of times, and the radio wave controller increases the output value of the carrier wave by one stage when the wireless tag communication device does not receive the response wave from the wireless tag for a second preset number of times.

8. The device according to claim 7, further comprising:

a search mode switcher configured to set an operation mode of the wireless tag communication device to a long-distance search mode in which the output value of the carrier wave is variable or to a short-distance search mode in which the output value of the carrier wave is constant.

9. A method for controlling a wireless tag communication device by a computer, the wireless tag communication device including an antenna configured to transmit a carrier wave and receive a response wave output from a wireless tag with respect to the carrier wave, and configured to specify a position of the wireless tag to be searched based on a radio wave intensity of the response wave received by the antenna, the method comprising:

switching, by a radio wave controller, the carrier wave between a first carrier wave to be transmitted in a first polarization direction and a second carrier wave to be transmitted in a second polarization direction;

comparing, by a comparator, a radio wave intensity of a first response wave output by the wireless tag with respect to the first carrier wave and a radio wave intensity of a second response wave output by the wireless tag with respect to the second carrier wave;

switching, by the radio wave controller, the carrier wave between the first carrier wave and the second carrier wave based on a comparison result of the comparator;

decreasing, by the radio wave controller, an output value of the carrier wave by one stage when the wireless tag communication device receives the response wave from the wireless tag a first preset number of times; and increasing, by the radio wave controller, the output value of the carrier wave by one stage when the wireless tag communication device does not receive the response wave from the wireless tag for a second preset number of times; wherein the radio wave controller is configured to control an output value of the carrier wave in a plurality of stages.

10. The method according to claim 9, further comprising:

setting, by the radio wave controller, an output mode of the carrier wave transmitted from the antenna to a dual polarization mode, in which the first carrier wave and the second carrier wave are alternately transmitted, or to a single polarization mode in which only one of the first carrier wave and the second carrier wave is transmitted.

11. The method according to claim 10, further comprising:

comparing, by the comparator, in the dual polarization mode, the radio wave intensity of the first response wave transmitted from the wireless tag with respect to the first carrier wave and the radio wave intensity of the second response wave transmitted from the wireless tag with respect to the second carrier wave transmitted subsequent to the first carrier wave; and switching, by the radio wave controller, the output mode to the single polarization mode in which the carrier wave with respect to the response wave having the higher radio wave intensity is continuously transmitted, as the comparison result of the comparator, when the radio wave intensity of one of the first response wave or the second response wave is continuously higher than that of the other response wave for a preset number of times or more.

12. The method according to claim 10, further comprising:
switching, by the radio wave controller, the output mode to the dual polarization mode when the antenna does not receive the response wave in the single polarization mode.

13. A method for controlling a wireless tag communication device by a computer, the wireless tag communication device including an antenna configured to transmit a carrier wave and receive a response wave output from a wireless tag with respect to the carrier wave, and configured to specify a position of the wireless tag to be searched based on a radio wave intensity of the response wave received by the antenna, the method comprising:
switching, by a radio wave controller, the carrier wave between a first carrier wave to be transmitted in a first polarization direction and a second carrier wave to be transmitted in a second polarization direction;
comparing, by a comparator, a radio wave intensity of a first response wave output by the wireless tag with respect to the first carrier wave and a radio wave intensity of a second response wave output by the wireless tag with respect to the second carrier wave; and
switching, by the radio wave controller, the carrier wave between the first carrier wave and the second carrier wave based on a comparison result of the comparator;
setting, by the radio wave controller, an output mode of the carrier wave transmitted from the antenna to a dual polarization mode, in which the first carrier wave and the second carrier wave are alternately transmitted, or to a single polarization mode in which only one of the first carrier wave and the second carrier wave is transmitted;
switching, by the radio wave controller, the output mode to the dual polarization mode when the antenna does not receive the response wave in the single polarization mode;
receiving, by a receiver, identification information that identifies the wireless tag to be searched; and
setting, by the radio wave controller, the output mode to the single polarization mode when a search for the wireless tag identified by the identification information received by the receiver is started.

14. The method according to claim 9, further comprising:
estimating by a radio wave information processor, a distance between the wireless tag communication device and the wireless tag to be searched and a direction of the wireless tag to be searched, based on the radio wave intensity of the response wave.

15. The method according to claim 9, further comprising:
setting, by a search mode switcher, an operation mode of the wireless tag communication device to a long-distance search mode in which the output value of the carrier wave is variable or to a short-distance search mode in which the output value of the carrier wave is constant.

16. The method according to claim 9, further comprising:
displaying, by a display, a positional relationship between the wireless tag communication device and the wireless tag.

17. The method according to claim 16, further comprising:
providing, by the display, a warning when an earlier radio wave intensity of the radio wave received by the antenna is lower than a subsequent radio wave intensity of the radio wave received by the antenna.

* * * * *